(12) United States Patent
Rengshausen et al.

(10) Patent No.: US 6,595,686 B2
(45) Date of Patent: Jul. 22, 2003

(54) DEVICE FOR MEASURING EFFECTIVE TEMPERATURE

(75) Inventors: Detlef Rengshausen, Dassel-Amelsen (DE); Bodo Rengshausen-Fischbach, Dassel-Amelsen (DE)

(73) Assignee: TriloG Thermotechnik GmbH, Dassel-Amelsen (DE)

( * ) Notice: Subject to any disclaimer, the term of this patent is extended or adjusted under 35 U.S.C. 154(b) by 0 days.

(21) Appl. No.: 09/832,817

(22) Filed: Apr. 11, 2001

(65) Prior Publication Data
US 2002/0167990 A1 Nov. 14, 2002

Related U.S. Application Data

(63) Continuation of application No. PCT/EP99/07537, filed on Oct. 7, 1999.

(51) Int. Cl.[7] .............................. G01K 7/02; G01K 3/02; G01K 3/08
(52) U.S. Cl. .................. 374/180; 374/112; 374/164
(58) Field of Search .................. 374/179, 164, 374/109, 112, 113, 181, 182, 208, 148, 204, 120, 135

(56) References Cited

U.S. PATENT DOCUMENTS

| | | | |
|---|---|---|---|
| 3,954,007 A | | 5/1976 | Harrigan |
| 4,047,431 A | | 9/1977 | Mulvaney et al. |
| 4,106,339 A | | 8/1978 | Baer |
| 4,138,878 A | * | 2/1979 | Holmes et al. ............ 73/15 R |
| 4,156,362 A | | 5/1979 | MacHattie et al. |
| 4,504,157 A | | 3/1985 | Crabtree et al. |
| 5,167,450 A | * | 12/1992 | Nukui et al. .................. 374/31 |
| 6,058,774 A | * | 5/2000 | Rengshausen ........... 73/204.24 |

FOREIGN PATENT DOCUMENTS

| | | | | |
|---|---|---|---|---|
| DE | 36 11 084 | | 10/1987 | ........... F24F/13/00 |
| EP | 0 214 294 | | 3/1987 | ........... G01J/5/02 |
| WO | WO 81/00462 | | 2/1981 | ........... G01W/1/06 |

\* cited by examiner

Primary Examiner—Diego Gutierrez
Assistant Examiner—Gail Verbitsky
(74) Attorney, Agent, or Firm—Merchant & Gould P.C.

(57) ABSTRACT

The invention relates to a device for measuring the temperature of a gas, especially air, said temperature (so-called effective temperature) being measured at least according to speed (wind intensity) and humidity. The inventive device comprises a housing (4) having a wall (6), which essentially separates the inside (4c) of the housing (4) from the outside environment. The device also comprises a temperature sensor (14) arranged inside the housing (4), and has a heating device (10), which is also arranged inside, said housing (4). The invention is characterized in that the outer side of the wall (6) of the housing (4) is essentially covered with a hydrophilic layer (8) made of material capable of absorbing moisture, and the wall (6) of the housing (4) comprises heat conductive material.

11 Claims, 1 Drawing Sheet

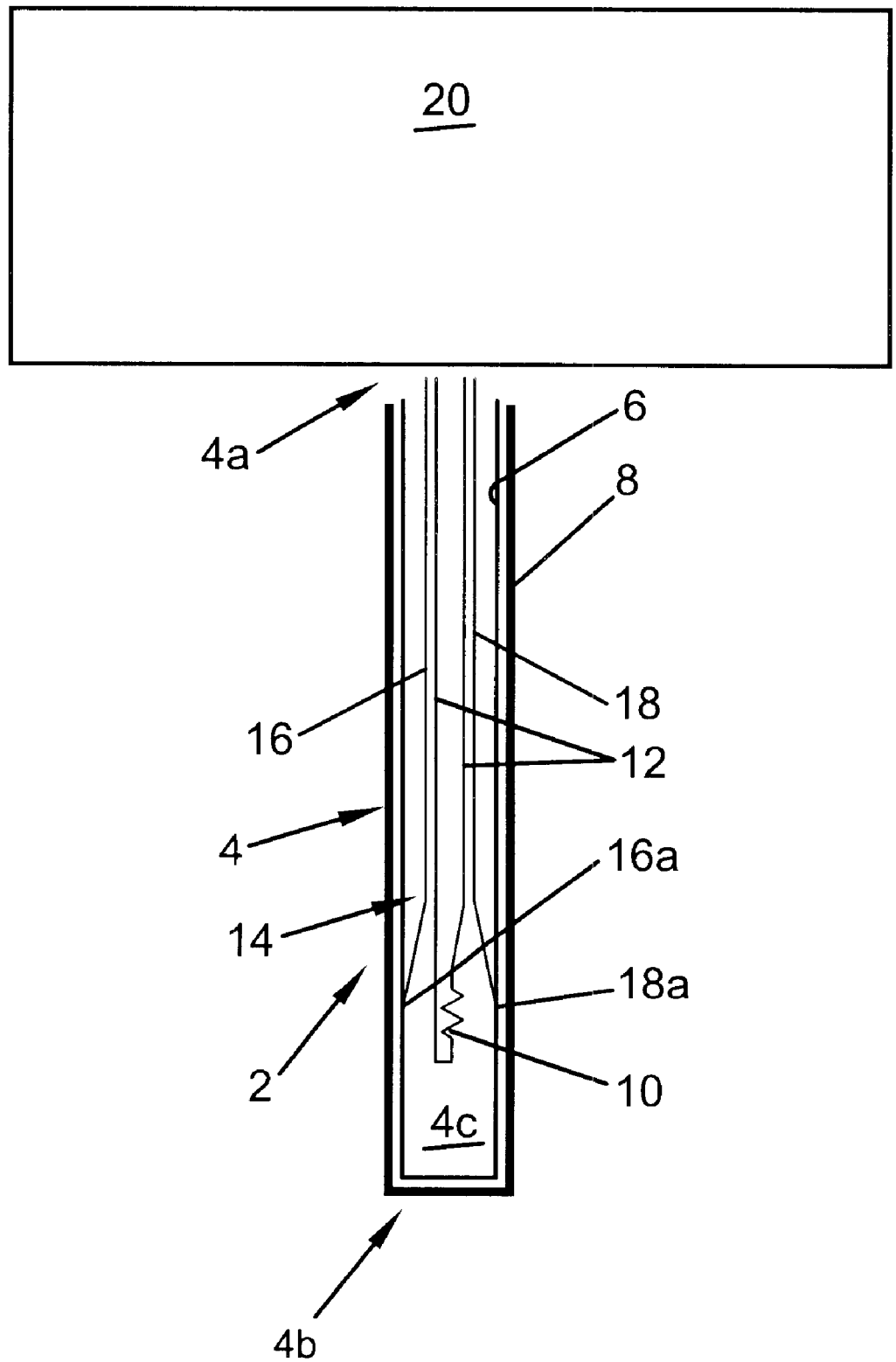

DEVICE FOR MEASURING EFFECTIVE TEMPERATURE

This application is a continuation of international application No. PCT/EP99/07537 filed Oct. 7, 1999.

The invention relates to a device for measuring the temperature of a gas, in particular of air, which temperature is dependent on at least the flow velocity and humidity of the gas, comprising a housing having a wall displaying a heat-conducting and electrically-conducting material, which wall essentially separates the interior of the housing from the exterior environment, a thermocouple arranged inside the housing, and heating equipment arranged inside the housing.

It is generally known that the objectively measured temperature of a gas or gas mixture, such as, in particular, the air, does not always correspond to the subjectively "felt" temperature. Factors such as, in particular, the gas velocity or wind velocity and the humidity influence the subjective sensation of the temperature.

A device of the type mentioned above is described in EP-A-0 214 294. In this known invention, a thermocouple is arranged inside the housing as the temperature sensor.

The object of the invention is to modify a device of the type mentioned in the introduction so that it operates in a more reliable manner.

This object is accomplished in a device of the type mentioned in the introduction by the fact that the end of one wire of the thermocouple is situated in contact with the inner side of the housing wall at a first location, the end of the other wire is situated in contact with the inner side of the housing wall at a second location, which is distanced from the first location, and the thermocouple forms a mean value from the temperature values measured at the two locations.

With the aid of the invention, more reliable measurement results are achieved than in the case of the prior art. For, although the housing wall consists of heat-conducting material, it is nevertheless possible that the housing wall does not exhibit a uniform temperature. That is to say, if the temperature is measured in only one location, then it can be affected by a singular defect, so that a falsely detected temperature is ascertained. Since according to the invention the temperature is measured by a thermocouple at two locations and automatically averaged, the device operates more reliably.

The invention is not suggested through the prior art. In the device according to U.S. Pat. No. 4,504,157, application is made of only a single temperature sensor, similarly in the device according to EP-A-0 214 294. To be sure, in the device according to DE-A-36 11 084 two temperature sensors are provided; however, only one temperature sensor is used for measuring the temperature of the housing wall, while the other temperature sensor is used merely as a thermostat for regulating the heating equipment.

In addition, the invention presents a simple and thus cost-effective structure, so that the use of the device according to the invention offers advantages precisely in cost-critical applications.

The arrangement according to the invention functions as follows. Through the heating equipment the interior of the housing is warmed, so that a certain temperature shows up on a temperature sensor arranged inside the housing. On the assumption of a temperature difference produced by the heating equipment with respect to the environmental temperature and held essentially constant, the temperature measured at the temperature sensor becomes so much the higher, the higher the environmental temperature outside the housing is, and so much the lower, the lower the environmental temperature is. In dependence on the wind velocity of the gas surrounding the housing, in particular the air, the housing wall is correspondingly cooled, since the wind, depending on its velocity, draws more or less energy and thus heat out of the interior of the housing through the housing wall designed so as to be heat conducting. In the same way the environmental humidity influences the temperature inside the housing. Since, that is to say, the moisture precipitating on the outside of the housing wall strives to evaporate, evaporation energy is necessary, which energy is drawn from the interior of the housing through the heat-conducting housing wall. Both of these effects, which can occur in a cumulative manner, act to cause a reduction of the heat measured in the interior of the housing by the thermocouple, so that the thermocouple is directly subjected to these influences and thus gives a temperature value that corresponds in essence to the "felt" temperature and can be appropriately processed in a possibly downstream-connected evaluation unit. Thus it is possible to determine simultaneously with the temperature the most important parameters influencing the latter, such as wind velocity and humidity, and to generate for the "felt" temperature only a single relevant signal, which can be processed and displayed in a downstream-connected evaluation unit.

Preferably, the outside of the wall of the housing in covered in the main with a hydrophilic layer of moisture-receptive material, in order to be capable of more effectively storing moisture precipitating on the outside of the housing wall. This embodiment in particular is based on the idea of reproducing the housing wall of the human skin with respect to sensitivity to temperature and the parameters influencing the latter, particularly humidity, using simple means and to the extent possible. In order to enable the reception of an appropriate degree of moisture for the measurement, the hydrophilic layer should consist of textile material, in particular felt material. The material here should appropriately be chosen so that it imitates the human skin with respect to its heat- and moisture-absorbing characteristics.

Since the device according to the invention is at least intended, among other things, for the measurement of the temperature as felt on the human skin, the heating equipment can, for example, radiate heat the temperature of which approximately corresponds to the average human body temperature. Accordingly, the heating equipment could be appropriately controlled or set so that, due to the heat generated inside the housing by the heating equipment, the temperature sensor measures a temperature value that approximately corresponds to the average human body temperature when ideally neither an influencing by the environmental temperature outside the housing (corresponding to the state of an ideal insulating of the housing with respect to the environment) nor an influencing by the velocity (wind strength) and humidity of a gas surrounding the housing, in particular the air, (thus, wind velocity=0 and humidity=0%) predominates. In this respect, such a temperature value is a matter of a reference value, which specifies the state of the measurement device according to the invention in which it is completely uninfluenced by the environment in an ideal manner; thus, in this state the parameters influencing the measured temperature are for practical purposes excluded. Alternatively, it is also conceivable to set the heating equipment in a situation in which the (objectively) measured temperature corresponds to the (subjectively) felt temperature; to this end, there are fixed criteria, to which one must then pay attention. For the rest, it goes without saying that, depending on the desired application case, a reference temperature other than the value of the average human body temperature can also be chosen.

In order to avoid a point-focused heating of the housing wall, but rather to realize the most uniform possible heat distribution inside the housing, the heating equipment should be arranged at a distance from the wall of the housing.

Preferably, the housing should be filled with a fill material, consisting in particular of casting material. In this way it is possible to improve the heat-transfer or heat-conducting characteristics inside the housing, or, as the case may be, to adapt to the desired application case, the fill material with the desired heat-conducting characteristics being chosen.

The housing can be designed as a pipe, in particular a cylindrical pipe, whereby are achieved, first, an especially high degree of mechanical strength, and second, an especially favorable relation between surface and interior volume.

The temperature sensor normally generates signals and delivers these to an evaluation unit for evaluation and display of the measured temperature value.

In the following, a preferred embodiment example is explained in detail with the aid of the single drawing, in which the device for measuring the felt temperature is represented schematically in a preferred embodiment.

Represented schematically in the single accompanying FIGURE, in a special, preferred embodiment, is a measuring device 2 for measuring the felt temperature. The measuring device 2 measures, in the manner described in greater detail below, the felt temperature, generates signals from the measured values, and transmits these signals to an evaluation unit 20.

The measuring device has a housing 4, which in the represented embodiment has an elongated design and possesses a cylindrical shape, thus formed as a pipe, and is arranged with its one end 4a adjoining the evaluation unit 20. Further, in the represented embodiment the one end 4a of the housing 4 is joined fast to the housing of the evaluation unit 20, so that long connection leads are unnecessary. The opposite, free end 4b of the pipe-shaped housing 4 can, according to choice, be open or closed. Obviously, a different shape and a different arrangement of the housing 4 are also conceivable.

The wall 6 of the housing 4 consists of a material that possesses both good heat-conducting characteristics and good electrical conductivity. This is the case above all when the housing wall 6 consists of metal.

The outer surface of the housing wall 6 is covered with a hydrophilic outer layer 8. This outer layer 8 consists normally of textile material, in particular felt material. In any case the outer layer 8 should consist of a material whose moisture-absorption characteristic essentially corresponds to that of the human skin.

The pipe-shaped housing 4 encloses an interior 4c, in which is arranged a heating element 10. In the represented embodiment the heating element 10 consists of a heating wire or of a heating resistance. However, the use of different types of heating elements is also conceivable Appropriately, the heating element should in any case be electrically operated, since it is connected via connecting leads 12 to the evaluation unit 20, which contains the control equipment (not shown in detail in the FIGURE) for regulating the heating element 10.

Further arranged in the interior 4c of the housing 4 is a temperature sensor 14, which in the represented embodiment example is designed as a thermocouple with two wires 16, 18 made of different materials. Conventionally, the one wire 16 consists of a nickel-chrome alloy and the other wire 18 of nickel. The two wires 16, 18 lead to an evaluation unit 20, in order to transmit the measured signals there.

In contrast to conventional thermocouples, the two wires 16, 18 are not connected to each other at their free ends 16a, 18a, in order to form a single measuring point, but rather are situated so as to be separated and at distance from each other, in each case in contact with the inside surface of the housing wall 6, and that in an opposite arrangement, as can be perceived from the FIGURE. Electrically, the two free ends 16a, 18a are coupled to each other via the electrically-conducting housing wall 6, whereby the functioning of a thermocouple is ensured. Yet with this particular arrangement two measuring points are realized, namely a first measuring point at the contact location of the free end 16a of the one wire 16 with the housing wall 6 and a second measuring point at the contact location, spaced apart from the first measuring point, of the free end 18a of the other wire 18 with the housing wall 6. By virtue of the electrically conducting connection of the free ends 16a, 18a of the two wires 16, 18 to each other via the electrically conducting housing wall 6, the ohmic resistance of which is close to zero, the temperature sensor 14, designed in the represented embodiment as a thermocouple, generates an electrical signal due to a voltage drop between the two wires 16, 18, which signal approximately indicates the mean value of the temperature values prevailing at the two measuring points. The signal thus generated on the wires 16, 18, indicating the measured temperature value, is transmitted to the evaluation unit 20.

As an alternative, it is also conceivable to provide for only one temperature measuring point or even more than two temperature measuring points, in which latter case preferably the forming of a mean value should again be carried out.

It goes without saying that the temperature sensor 14 can also be of a different design; for example, the temperature sensor can display a heat-sensitive resistance. However, it is appropriate to use an electrical temperature sensor 14.

In the represented embodiment the temperature sensor 14 measures the temperature at the inner side of the housing wall 6. In principle, it is also conceivable to arrange the temperature sensor in the interior 4c of the housing 4 at a distance from the housing wall 6; to be sure, this could increase the sluggishness of the measuring, due to the delayed heat transmission.

The heat-conducting capability in the interior 4c of the housing 4 is, of course, increased through a fill materiel 22, which material 22 fills the interior 4c of the housing 4 in the described embodiment. Through special selection of the material 22 with a specific heat conductivity for use as the fill material, the interior 4c of the housing can be given the desired heat-transmission characteristics. Preferably, the material should be so chosen for the fill material 22 that the heat-transmission characteristics of the interior 4c of the housing 4 approximately corresponds to those of human skin.

The evaluation unit 20 analyzes the signals from the temperature sensor 14 and displays them, for example on a display device (not shown in the FIGURE).

In the following, the manner of functioning of the measuring device 2 is described.

The heating element 10 is regulated by the control equipment contained in the evaluation unit 20 and heats the interior 4c of the housing 4 or the fill material located therein, as the case may be. In this way a certain temperature arises at the measuring points formed by the free ends 16a, 18a of the two wires 16, 18. For example, the heating element 10 could be set or regulated so as to release such an amount of heat that, for the case in which the measuring device 2 is not affected by any outside environmental influences such as temperature, wind velocity, and humidity, causes at the measuring points of the temperature sensor a temperature approximately corresponding to the human body temperature. Thus, in such a setting of the heating element the parameters influencing the objectively measured temperature should, to the degree possible, be excluded. Alternatively, it is of course also conceivable to undertake the setting of the heating element 10 when the objectively measured temperature corresponds to the felt temperature, for which purpose certain fixed criteria are to be taken into account or observed. It goes without saying that as the reference magnitude a temperature value different from that of the human body can also be chosen.

This temperature measurement is now influenced by the temperature of the air surrounding the housing 4 of the measuring device 2. Responsible for this is the good heat-transmission capability of the housing wall 6. Accordingly, the temperature at the measuring points is higher, the warmer the surrounding air is, and lower, when the surrounding air becomes cooler. In the case in which the air moves, thus wind is present, the wind draws, according to the wind velocity, more or less heat out of the interior 4c of the housing 4, so that the wind velocity likewise has an influence on the temperature measured at the measuring points.

The humidity has a similar influence. In this regard, the hydrophilic outer layer 8 on the outside surface of the housing wall 6 comes into effect. That is to say, this hydrophilic outer layer 8 takes up more or less moisture depending on the surrounding humidity. Through this, the heat loss from the interior 4c of the housing 4 increases. Since moist air effects a greater drawing off of heat than does dry air, the humidity likewise affects the temperature to be measured.

As a final result, the temperature sensor 14 measures a temperature value that depends not only on the outside temperature, but also on the wind velocity and the humidity of the surrounding air. By virtue of the above-described structure, the measurement of the temperature so influenced, this being a matter of the felt temperature, takes place directly. Accordingly, the output signal of the temperature sensor 14 directly represents the measured felt temperature, which in the downstream-connected evaluation unit 20 need only still be appropriately processed and, for example, displayed.

What is claimed is:

1. A device for measuring an average felt temperature corresponding to a felt temperature of a gas located externally to a wall of the device, the device comprising:
   a housing having a wall formed with a material that conducts heat and electricity, the wall having an inner surface defining a cavity;
   a heating element positioned in the cavity; and
   a thermocouple positioned in the cavity, the thermocouple having at least first and second wires, the first wire having an end in electrical contact with the inner surface of the wall at a first location, the second wire having an end in electrical contact with the inner surface of the wall at a second location, the first location being spaced from the second location, wherein the thermocouple outputs a signal corresponding to the average value of the felt temperatures at the first location and the felt temperature at the second location;
   wherein the felt temperatures at the first location and the second location are influenced by the ambient temperature, velocity and humidity of the gas located externally to the wall, and wherein said average value corresponds to the felt temperature of said gas located externally to the wall; said device further including means for simultaneously adjusting the felt temperatures at the first location and the second location by the ambient temperature, velocity and humidity of said gas located externally to the wall.

2. The device according to claim 1 wherein the wall of the housing has an outer surface and the device further comprises a hydrophilic material covering at least a portion of the outer surface.

3. The device according to claim 2, wherein the hydrophilic material is a textile material.

4. The device according to claim 3 wherein the textile material is felt.

5. The device according to claim 1 wherein the heating element is spaced from the inner surface of the wall.

6. The device according to claim 5 wherein the heating element radiates heat, the temperature of the heat corresponding to the average human body temperature.

7. The device according to claim 5 wherein the heating element is arranged between the first and second positions on the inner surface of the wall.

8. The device according to claim 1 wherein the cavity is filled with fill material, the fill material including a casting material.

9. The device according to claim 1 wherein the wall is cylindrical.

10. The device according to claim 1 further comprising an evaluation unit arranged to receive the signal from the thermocouple, the evaluation unit configured to evaluate the signal and to display the measured felt temperature.

11. A method of measuring the felt temperature of a gas located externally to a wall of a device, the felt temperature being an ambient temperature influenced by factors including at least the velocity and humidity of the gas, the method comprising:
   providing a measuring d vice, the measuring device having a wall defining a cavity, the wall being formed with a material that conducts heat and electricity, the wall having an inner surface defining a cavity, a heating element and a thermocouple assembly being positioned within the cavity, the thermocouple assembly arranged to measure the felt temperature at at least two positions;
   generating heat inside the cavity;
   measuring the felt temperature at each of the at least two positions on the housing; and
   generating an average value of the felt temperature measured at the at least two positions wherein said average value corresponds to the felt temperature of said gas located externally to the wall.

* * * * *